United States Patent
Hänninen

(10) Patent No.: US 10,290,213 B2
(45) Date of Patent: May 14, 2019

(54) SYSTEM AND METHOD TO DRAW ATTENTION TO PERSON

(71) Applicant: InnoTrafik Oy, Helsinki (FI)

(72) Inventor: Jouni Hänninen, Seinäjoki (FI)

(73) Assignee: INNOTRAFIK OY, Helsinki (FI)

( * ) Notice: Subject to any disclaimer, the term of this patent is extended or adjusted under 35 U.S.C. 154(b) by 0 days.

(21) Appl. No.: 15/840,442

(22) Filed: Dec. 13, 2017

(65) Prior Publication Data

US 2018/0174466 A1    Jun. 21, 2018

(30) Foreign Application Priority Data

Dec. 16, 2016 (FI) ..................................... 20165976

(51) Int. Cl.
  *G08G 1/16* (2006.01)
  *B60Q 1/00* (2006.01)
  (Continued)

(52) U.S. Cl.
  CPC .............. *G08G 1/166* (2013.01); *B60Q 1/00* (2013.01); *E01F 9/615* (2016.02);
  (Continued)

(58) Field of Classification Search
  CPC ...... G08G 1/166; G08G 1/005; G08G 1/0116; G08G 1/0133; G08G 1/07; E01F 9/615;
  (Continued)

(56) References Cited

U.S. PATENT DOCUMENTS 3,863,251 A * 1/1975 Gould ................... G08G 1/005
                                                340/815.53
6,104,313 A * 8/2000 Boyd, II ................... E01F 9/65
                                                116/63 R
(Continued)

FOREIGN PATENT DOCUMENTS

EP    2 375 397    10/2011
ES    2 365 089     9/2011
(Continued)

OTHER PUBLICATIONS

Search Report for FI 20165976, dated Jun. 20, 2017, 2 pages.
Extended European Search Report dated Apr. 24, 2018 in corresponding European Application No. 17206359, 2 pages.

*Primary Examiner* — Nay Tun
(74) *Attorney, Agent, or Firm* — Nixon & Vanderhye PC

(57) ABSTRACT

The invention comprises a method and a system for drawing attention to a person crossing a passageway. The system comprises at least two traffic signs in connection with each other through the passageway, at least one control device operationally connected to the traffic sign, at least one detector, at least one light source within the traffic sign, and at least one illumination device to illuminate the person. In the system, the control device is arranged to receive information from at least one detector, and based on said information determine the position of the person on said passageway or outside of it, and when the person is located outside the passageway, to activate at least one light source and/or illumination device of the traffic sign, and to send (Continued)

information to at least one other traffic sign to activate at least one light source and/or illumination device of said at least one other traffic sign.

25 Claims, 3 Drawing Sheets

(51) Int. Cl.
| | |
|---|---|
| *F21V 23/04* | (2006.01) |
| *G08G 1/005* | (2006.01) |
| *G08G 1/01* | (2006.01) |
| *G08G 1/07* | (2006.01) |
| *E01F 9/615* | (2016.01) |
| *F21W 131/103* | (2006.01) |

(52) U.S. Cl.
CPC ......... *F21V 23/0471* (2013.01); *G08G 1/005* (2013.01); *G08G 1/0116* (2013.01); *G08G 1/0133* (2013.01); *G08G 1/07* (2013.01); *F21W 2131/103* (2013.01)

(58) Field of Classification Search
CPC . B60Q 1/00; F21V 23/0471; F21W 2131/103
See application file for complete search history.

(56) References Cited

U.S. PATENT DOCUMENTS

| | | | |
|---|---|---|---|
| 6,243,644 B1 * | 6/2001 | Dengler | ................... G08G 1/01 340/907 |
| 7,688,222 B2 * | 3/2010 | Peddie | ............. G08G 1/096783 116/63 P |
| 7,852,234 B1 | 12/2010 | Borenstein et al. | |
| 8,081,087 B2 * | 12/2011 | Jones | ..................... G08G 1/095 246/125 |
| 8,269,654 B2 * | 9/2012 | Jones | ..................... G08G 1/095 246/125 |
| 2004/0183694 A1 * | 9/2004 | Bauer | ................... G08G 1/095 340/907 |
| 2005/0174776 A1 | 8/2005 | Althaus | |

FOREIGN PATENT DOCUMENTS

| | | |
|---|---|---|
| FR | 2 583 854 | 12/1986 |
| JP | H10-60831 | 3/1998 |
| KR | 10-2015-0040061 | 4/2015 |
| WO | 87/00326 | 1/1987 |
| WO | 2010/092229 | 8/2010 |

\* cited by examiner

SYSTEM AND METHOD TO DRAW ATTENTION TO PERSON

This application claims priority to FI Patent Application No. 20165976, filed Dec. 16, 2016, the entire contents which are hereby incorporated by reference.

BACKGROUND OF THE INVENTION

The invention relates to a system and method for drawing attention to a person crossing a passageway.

A pedestrian crossing should guarantee a safe crossing of a road for pedestrians and cyclists. To improve safety, traffic signs illuminated with various technologies have been developed, by means of which drivers and other road users may better take into account the existence of a pedestrian crossing. An illuminated traffic sign does not, however, illuminate persons crossing the pedestrian crossing whereby a pedestrian is poorly distinguishable against a dark background when it is dusky and dark, in particular. By means of an illuminated traffic sign it is not possible to adequately draw the attention of drivers of a vehicle to pedestrians or cyclists crossing a pedestrian crossing, which is why many accidents still take places at pedestrian crossings.

BRIEF DESCRIPTION OF THE INVENTION

An object of the invention is thus to provide a method and equipment implementing the method so as to solve the aforementioned problems. The object of the invention is achieved by a method and system which are characterized by what is disclosed in the independent claims. Some preferred embodiments of the invention are disclosed in the dependent claims.

The invention is based on the fact that a method and system have been developed for drawing attention to a person crossing a passageway, the system comprising at least two traffic signs that are in connection with each other through the passageway, such as a pedestrian crossing. The system additionally comprises at least one control device operationally connected to the traffic sign, at least one detector, at least one light source within the traffic sign, and at least one illumination device to illuminate the person and/or traffic sign. The control device is arranged to receive information from at least one detector and, on the basis of this information, to determine the position of the person on the passageway or outside of it. If a person is located outside of the passageway, the control device activates at least one light source and/or illumination device of the traffic sign, and sends information to at least one other traffic sign to activate the light source and/or illumination device of said at least one other traffic sign.

The advantage of the method and system according to the invention is that as a pedestrian or cyclist is approaching a pedestrian crossing at a crossroads or somewhere else, the system automatically illuminates a traffic sign and, in addition to this, switches on the illumination devices in connection with the traffic sign. The illumination devices are directed so that they illuminate a person as he is waiting for the light to turn green at the base of the traffic sign and also at the time he is crossing the pedestrian crossing. At the same time as the system detects a person, it identifies the direction he is coming from and whether it is dusky or dark outdoors, which is when illumination is needed. Based on this information, the system sends information to the system of the traffic sign on the other side of the passageway, which switches on the lights of the second traffic sign, too, and activates the illumination device. This way, the person is illuminated from both sides of the pedestrian crossing as he is crossing the pedestrian crossing, which guarantees that the driver of a vehicle will clearly and continuously see the person crossing the pedestrian crossing.

The system is so designed that as the pedestrian exits the pedestrian crossing on the other side of the road, the light will not be switched on anew. If the lights were also switched on when a person is exiting the pedestrian crossing, the driver of a vehicle would assume there is a pedestrian who is crossing the pedestrian crossing even though the pedestrian or cyclist has already left the place. This could frustrate the driver of a vehicle and in the worst case scenario cause him to ignore the lights the next time. This is why the traffic signs and pedestrian crossings are only illuminated when there is a pedestrian or cyclist in the vicinity of the traffic sign, who is likely to cross the pedestrian crossing.

BRIEF DESCRIPTION OF THE FIGURES

The invention will now be described in more detail in connection with preferred embodiments and with reference to the accompanying drawings, in which.

DETAILED DESCRIPTION OF THE INVENTION

Figure 1A:
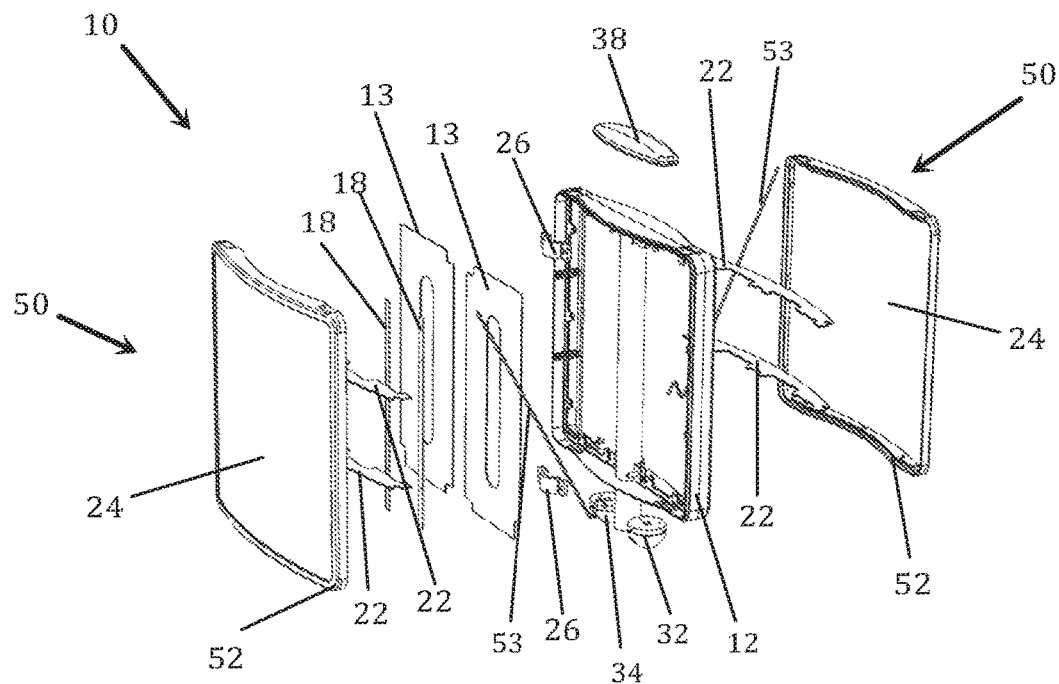
FIG. 1a shows the structure of a traffic sign according to an embodiment of the invention.

FIG. 1a shows a structural diagram of a traffic sign 10 according to an embodiment of the invention. The traffic sign 10 advantageously consists of a body 12, at least one mounting plate 13, at least one illumination source 40, at least one support structure 22, and two lids 50. In addition, the traffic sign 10 may comprise at least one of the following: a detector 34, illumination device 32, a solar cell 38, a fastener 26, and a holder 53. In the example according to FIG. 1a, illuminated LED strips 18 and/or may be used as the light source 40, or power LEDs to create spot-like light. The light sources 40 may be installed inside the traffic sign in a desired pattern, such as a triangle or vertically. In the traffic sign 10 of FIG. 1a, the mounting plates 13 may be fixed to each other and/or the body 12. The LED strips 18 to be illuminated may be fixed to the mounting plates 13. The material used for the mounting plates 13 may be plastic or aluminium, for example. To protect the mounting plates 13 and light sources 40, support structures 22 may by fastened. There may be one or more support structures 22, and they may be fixed to the body 12 horizontally or vertically in notches made in the body 12, for example. The support structure 22 is so shaped that it has recesses at the light sources 40 whereby impacts to the traffic sign 10 do not immediately break the light sources. The support structure 22 is advantageously of transparent plastic, such as acrylic, in which case they do not prevent the light from passing from the lights sources 40 to a patterned foil on the lid 50. The purpose of the support structures 22 is to receive external forces the traffic sign 10 is subjected to, such as wind load and/or point loads whereby the traffic sign 10 is more durable.

The lid 50 may comprise a transparent sheet 24, to which the patterned foil is attached. The illuminated LED strips 18 illuminate the patterned foil entirely from behind the foil. The light from power LEDs may be used, for example, as alert lights such as a flashing light in which case the light from the LEDs may be shown directly outward through holes made in the patterned foil, for example. Power LEDs may also make use of an intensifier colour, such as red light to attract attention on the traffic sign 10. The traffic sign 10 may be a traffic sign 10 indicating a pedestrian crossing or another traffic sign 10.

As the light source 40, one or more light-emitting diodes (LED) are used due to their low power consumption, fast controllability and long service life. In some embodiments, other light sources may also be used, such as incandescent lamps, fluorescent lamps, or cold cathode lamps. The light source is advantageously cooled, in particular with the use of light-emitting diodes, to prolong the service life of the light source. The light source may also be adapted to emit continuous or flashing light.

A traffic sign may comprise at least one illumination device 32 to illuminate a person and/or traffic sign 10. As the lights of the illumination device 32, the solutions according to the light source 40 may be used. There may be one or more illumination devices 32 and they may be fastened to the body 12 of the traffic sign 10 and/or to at least one lid 50 and adapted to illuminate the traffic sign 10 and/or a person in the vicinity of the traffic sign 10 and/or crossing a passageway. Illumination devices 32 may be fixed to the lower part of the body 12 of the traffic sign 10, from where they illuminate a person in the vicinity of the traffic sign 10 and crossing the pedestrian crossing.

In an embodiment, at least one illumination device 32 may be a spotlight that illuminates the traffic sign 10 from the outside. Such a spotlight may comprise a protrusion that has an LED light provided with a lens at its end. Advantageously, the lens has a lobe of 140 degrees. The same material may be used as the material of the spotlight as in the body 12, the material advantageously being aluminium. The spotlight may be a spotlight fixed to the upper part of the body 12, which illuminates the traffic sign 10 from the top downward, or a spotlight fixed to the lid 50, which illuminates the traffic sign 10 from the bottom upward. If need be, spotlights may be placed in front of and/or behind the traffic sign 10, and there may one or more spotlights at the upper and/or lower parts of the traffic sign 10 as required. By illuminating the traffic sign also from the outside by means of spotlights, there is no need to install that many light sources 40 inside the traffic sign 10.

The body 12 of the traffic sign comprises a frame, which is advantageously plastic, plastic compound, composite, or metal. In an embodiment, the body is aluminium. The body 12 may be made model-specific taking the future usage environment into account. In outdoor use, for example, the body is advantageously water-tight, weatherproof and suitable for outdoor use, according to the protection class IP65, for example. The traffic sign 10 may advantageously be installed at the end of a metal pipe. The notch at the upper part of the body 12 may be placed over the top part of the metal pipe and the body is fastened to the metal pipe by means of fasteners 26.

Figure 1B:
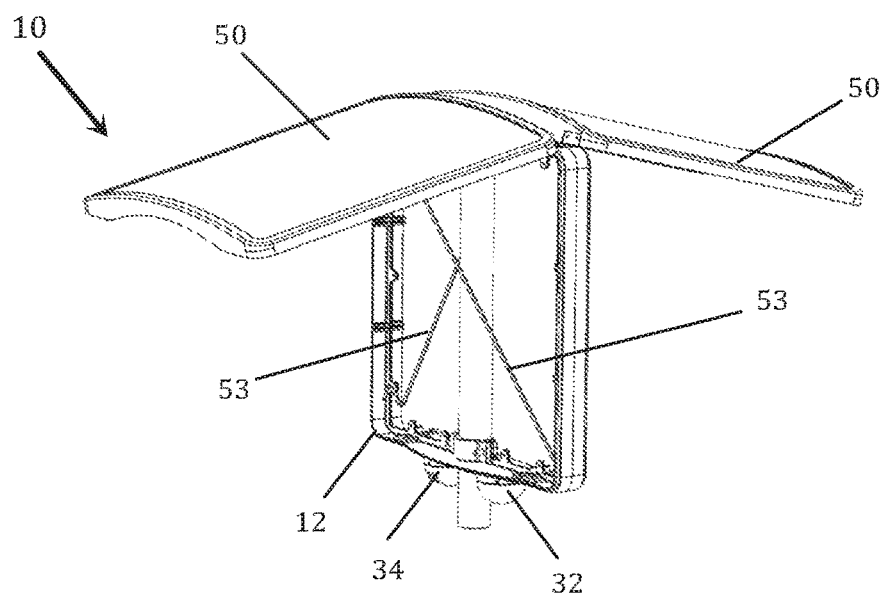
FIG. 1b shows the traffic sign according to an embodiment of the invention with both of its lids open.

FIG. 1b shows a traffic sign 10 with both of its lids 50 open. At least one of the lids 50 of the traffic sign 10 may be arranged to be openable by means of one or more fastening means. The openable lid 50 may be fixed to the front and/or the rear part of the body 12. The fastening means may be a hinge or another suitable similar means. The lid 50 may comprise a transparent sheet 24, to which a patterned foil is attached, or the lid 50 may be non-transparent and made of the same material as the body 12, for example. The lid 50 may additionally comprise a frame part 52 to which the transparent sheet 24 and foil may be fixed. By means of the fastening means, such as a hinge, the lid 50 may be conveniently opened for installation and maintenance operations. The fastening means may be fixed to any edge of the body, but they are advantageously located at the upper part of the body whereby the lid 50 may be conveniently opened upwards by means of the hinge and supported open by means of the holder 53. This way, the lid 50 stays up in the opened position for as long as installation of maintenance work is deemed necessary. The lids previously in use, which were unscrewed entirely off the traffic sign for installation and maintenance work, were laborious to unfasten and fasten in the difficult working conditions by a road. The inventive openable lid mechanism makes the installation and maintenance operations of a traffic sign faster and easier.

The lid 50 may be locked by using the generally known locking methods or locks. The lid 50 may be locked by means of one or more hooks fixed to the bottom part of the body 12, which are turned to a closed and open position by means of a screw at the bottom of the body 12. To lock the lid 50, additional screws may also be used, which prevent the lid from opening even if the hook opened due to, for example, wind, impact or another reason. In such a case, the lid is opened by first unscrewing the additional screw at the bottom and by then opening the screw of the hook. The lid 50 is usually locked close in at least two places.

On the front surface of at least one sheet 24 may have a patterned foil having the desired pattern of the traffic sign 10. Here, front surface refers to the surface that will mainly show when the traffic sign 10 is operational, in other words, the surface that the party detecting the traffic sign sees. Therefore, the light of the illumination element comes through the foil, as seen by the detecting party. The sheet 24 is advantageously an acrylic or plexiglass to which the patterned foil is glued. In the case of a two-sided sign 10, a patterned foil has been glued to the outer surface of both sheets 24, whereby the illuminated pattern of the traffic sign 10 is visible from both the front and back. In this case, the light sources 40, such as LED strips 18, fixed to both sides of the mounting plates 13, illuminate the patterned foils whereby the traffic sign 10 is seen illuminated from both sides.

The patterned foil may have several different patterns out of which the desired pattern may be selected as needed. The different patterns may be made brought out by illuminating the foil from a different direction. In some embodiments, a patterned foil may in addition to a separate patterned foil refer to a pattern arranged directly on the front surface of the sheet 24, which is formed, for example, by painting, sanding, engraving, etching, and/or with another surface treatment method.

Advantageously, the patterned foil of the traffic sign 10 is substantially a similar foil as the one used in conventional traffic signs attached on a wood-based sheet. Such foils used in traffics signs are reflective and are thus well visible when it is dusky or dark also in case a light source is not illuminating, but light is focused on the sign from the outside, such as the headlights of a vehicle. This being the case, when the traffic sign 10 is switched off for maintenance or due to other reasons, the sign still works as a conventional traffic sign.

Figure 2:
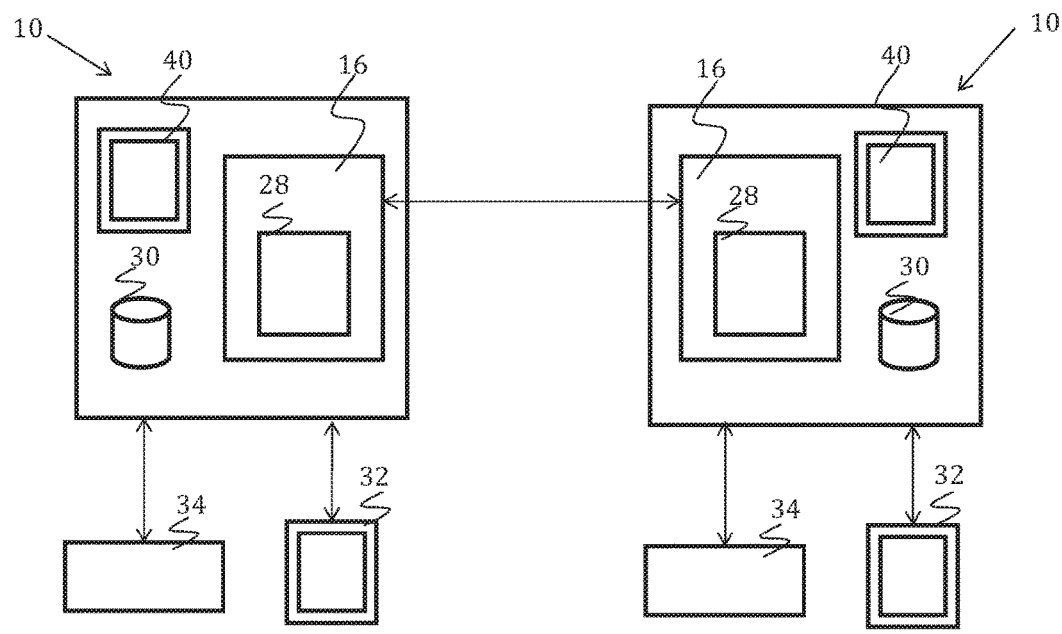
FIG. 2 shows the diagram of a system according to an embodiment of the invention.

FIG. 2 shows the communication means 28 of the control device 16 of the traffic sign 10, which enable the control of the illumination of the traffic sign. The communication means 28 are configured to at least receive illumination data but they are preferably also configured to transmit data from the sign 10 to either other control means 16 or to some other device. In its simplest form, the communication means 28 may be a twin cable, in which illumination data is expressed as a variation in voltage. The communication means 28 are preferably a wireless radio transceiver capable of communicating with external devices, such as other signs, control devices and/or a control room. The wireless connection may be implemented using various methods, frequencies and protocols, their significance for the end result being small as the amount of data to be transferred is very small. In addition to radio waves, the communication of the wireless communication means may be based on e.g. sound, light or some other wireless means.

The traffic sign 10 that comprises the wireless communication means 28 has an energy source 30 from which the sign 10 draws the electric power it needs. The energy source may be a connection to an electrical network, an accumulator, a single-use battery, an energy harvester and/or some other energy source. In the traffic signs of FIGS. 1a and 1a, the energy source 30 may be an accumulator or a plurality of them. The accumulator may be charged with the solar cell 38. The control device 16 operates on electric current which is arranged for the control device 16 from the energy source 30 referred to in the above. In the embodiment according to FIG. 1a, the control device 16 is placed in connection with the traffic sign 10. In the same context, the accumulators or batteries associated with the entity formed by the control device and the sign may be used as the energy source 30, in which case the system is in a physically compact form and simple to install. In an embodiment, at least one illumination device 32 is fastened to the body 12 of the traffic sign 10 and adapted to illuminate a person in the vicinity of the traffic sign 10 and/or crossing a passageway. In an embodiment, at least one illumination device 32 is fastened to the body 12 of the traffic sign and/or to at least one lid 50 and adapted to illuminate the traffic sign 10 from the outside.

In addition, the traffic sign 10 may have, or they may be externally to it, at least one illumination device 32 operationally connected to the traffic sign. With the illumination device 32, the illumination may be arranged to be of the desired colour and, if need be, flashing. As the lights of the illumination device 32, the solutions according to the light source 40 may be used. In the embodiment of FIG. 1a, the sign 10 may be a traffic sign indicating a pedestrian crossing, having illumination devices 32 that are arranged to illuminate bicycle and pedestrian traffic waiting to cross a pedestrian crossing and that crossing the pedestrian crossing, by means of spot lights, for example. The illumination device 32 may be connected to the sign 10 either through a wired or wireless connection.

The control device 16 comprises communication means 28 for establishing the wireless or wired connection and for transferring data. In an embodiment, the traffic sign comprises the communication means 28 and receives the illumination data from the communication means 28 of the control device 16 outside the traffic sign. In an embodiment, the communication means 28 make it possible to send the illumination data to the sign 10 to control illumination. The communication means 28 are configured to at least transmit illumination data but they are preferably also configured to transmit and receive data with a plurality of signs, control devices 16, detectors 34 and/or other devices. In its simplest form, the communication means 28 may be a twin cable. The communication means 28 is preferably a wireless radio transceiver capable of communicating with external devices, such as other signs, control devices and/or a control room. The wireless connection may be implemented using various methods, frequencies and protocols, their significance for the end result being small as the amount of data to be transferred is very small. In addition to radio waves, the communication of the wireless communication means may be based on e.g. sound, light or some other wireless means.

The control device 16 may comprise at least one of the following detectors 34; a timer, twilight detector, motion detector, radar, camera, and audio unit. Advantageously the detector is a passive infrared detector (PIR). The detector 34 may also be an independent device in communication with the control system 16 through a wired or wireless connection. In an embodiment, the control device 16 is placed within the device 10 and the detectors 34 are placed in detectors 34 outside the body 12 of the sign 10. The detectors may also be located elsewhere inside or outside the sign 10. The control device may also be outside the sign 10 operationally connected to the sign 10. If the control device 16 is located outside the sign 10, the sign 10 has its own communication means 28 for receiving illumination data from an external control device 16. Based on the signal produced by the detector 34, the control device 16 may send information on the detection straight to the sign 10, or through one or more control devices 16. The information on the detection may comprise illumination data, a speed measured by the radar, information on a person's direction of travel, lightness detected by the twilight detector, and/or another detected piece of information. To control one traffic sign 10, a plurality of control devices 16 may advantageously be used, or one control device 16 may be used to control a plurality of traffic signs. For example, a control device 16 in connection with a pedestrian crossing traffic sign may send information to traffic signs on both sides of a road as a detector 34 detects a predefined event, such as a pedestrian approaching. In an embodiment, the communication means 28 of the control devices 16 are arranged equal, whereby they forward the information they have received. In another embodiment, the communication means of the control devices 16 are arranged to manage, process, receive and/or transmit information from a control centre or control room, for example, to configure the control device whereby it is possible to manage in a centralized manner a plurality of control devices 16 and the signs possibly in connection with them.

In an embodiment, the traffic sign 10 additionally comprises a body 12, at least one light source 40 in connection with the body, a patterned foil at least partly reflecting light arranged to be illuminated by means of at least one light source 40. In such a case, the at least one light source 40 may be arranged, based on the illumination data received, to illuminate the foil from the rear so that the foil is between the light source 40 and the possible detecting party.

In an embodiment, the control device 16 has a diagnostics detector, which monitors events inside and/or outside the control device, and/or events inside and/or outside signs and devices in communication with the control device. In an embodiment, information may be transmitted to the diagnostics detector on the detected faults in the light source 40 or the illumination device 32 of the traffic light 10, or the state of the energy source such as the remaining charge of the accumulator or batteries. In another embodiment, the diagnostics detector may gather data from the data of one or more detectors 34. This feature may be used for traffic count, for example, when the detector is configured for this purpose, too. Depending on the detectors 34 of the control device 16, the traffic count may focus on, for example, the number of pedestrians, the number of adults/children/cyclists crossing the pedestrian crossing, speed of cars, number of passenger cars/heavy traffic vehicles, the number of those passing the sign at a particular side, or any other variable the detectors of the control device recognise. The sign 10 may also have a diagnostics detector for compiling diagnostics information and transmitting it to a control device, for example. The diagnostics data gathered by the diagnostics detector may advantageously be transmitted from the control device 16 by the communication means 28 to a predetermined location, such as a control centre or control room. In an embodiment, the control device 16 may also comprise a memory for storing information and settings received from the control centre or control room, for example.

The embodiments described in the application may be combined as deemed suitable and necessary. One embodiment of the invention is, for example, the system shown in FIG. 2, which comprises a number of traffic signs 10 according to the embodiment described in the above as well as detectors 34 and illumination devices 32 operationally connected to them. An example of such a system is an alert system in connection with a pedestrian crossing. This exemplary system comprises at least two traffic signs 10, which may be illuminated traffic signs indications a pedestrian crossing. These at least two traffic signs 10 are linked to each other through a passageway, such as a pedestrian crossing. The detectors 34 in a wired or wireless communication with the traffic sign 10 may comprise at least one of the following; a twilight detector, motion detector, and direction detector. If the twilight detector detect that it is dusky or dark, and the motion detector detects that an individual of bicycle and pedestrian traffic has arrived near a pedestrian crossing, and the direction detector determines the direction of approach of the individual of bicycle and pedestrian traffic, these details are transmitted to the control device 16 of the sign 10 either through a wired or wireless connection. The control device 16 receives the information from the detector 34 in connection with the traffic sign 10 on the person approaching the traffic sign, lighting conditions, and direction, and on the basis of said information determines the person's position on the passageway, such as a pedestrian crossing or outside of it, and determined the lighting condition.

If the person is outside the pedestrian crossing and it is dusky or dark enough, the control device 16 activates at least one light source 40 and/or illumination device 32 of the traffic sign 10. In addition, the control device transmits the information received from the detector unit 34 to at least one other traffic sign 10, the control device 16 of the traffic sign activating at least one light source 40 and/or illumination device 32 of said at least one other traffic sign. This results in the pedestrian crossing signs and the person crossing the pedestrian crossing being seen illuminated to drivers approaching the pedestrian crossing to tell them that there is a pedestrian crossing ahead and someone is about to cross it. The information sent by the control device 16 may be received at all the traffic signs 10 associated with the pedestrian crossing in question, all the light sources 40 and illumination devices 32 of which will activate so that the drivers coming from the opposite direction, too, would be able to take the situation into account. The system is particularly efficient because it is activated at the time someone is approaching a pedestrian crossing or is in its vicinity. The lights may be activated for a predetermined period, after which they are switched off. Such a time period may be, for example, 13 seconds, which is the estimated average time it takes for a person to cross a pedestrian crossing.

If the person is on the pedestrian crossing and it is dusky or dark enough and the person is coming towards the traffic sign 10 away from the pedestrian crossing, the control device 16 does not, however, activate the light sources 40 or illumination devices 32 of the traffic sign 10 or forward any information, because it is not desirable to switch on the lights anew for no reason, The biggest advantage of the system is, in particular, in the fact that it is not activated when a person is leaving a pedestrian crossing, whereby drivers of vehicles using the road do not expect in vain people to cross the pedestrian crossing.

Figure 3:
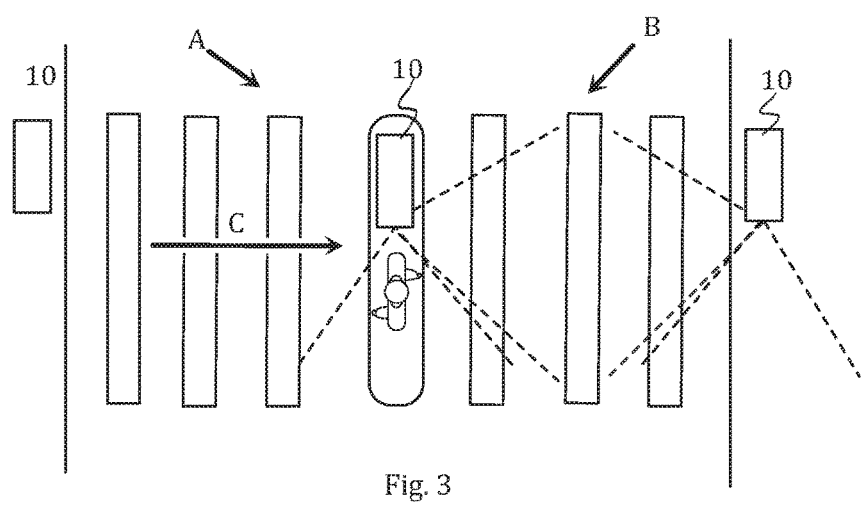
FIG. 3 shows a system according to an embodiment of the invention.

FIG. 3 shows a system according to an embodiment, in which at least one traffic sign 10 may be in connection with at least two other traffic signs 10 through a first A and a second passageway B. The first passageway A is located first in relation to the direction of travel C of the person, and the second passageway B after the first passageway. At both ends and at the middle of the passageways A and B there are traffic signs 10. As the person crosses the first passageway A, the light sources and illumination devices of the traffic signs 10 on both sides of it are on. As the person arrives at a traffic island located at the first traffic sign 10, the illumination devices 32 and light sources 40 on both sides of the passageway 10 switch off, because the person has crossed the first pedestrian crossing. Here, the control device 16 of the traffic sign 10 in the middle is arranged to receive information on a person approaching the traffic sign 10 from at least one detector 34, and on the basis of the information to determine the position of the person on the first A or second passageway B, or outside of them. If the person is on the first passageway A, the person is coming off the first passageway A and continuing to the second passageway B. In such a case, the person is outside the second passageway B whereby the control device 16 activates at least one light source 40 and/or illumination device 32 of the traffic sign in the middle, and transmits the information obtained from the detector to at least one other traffic sign, which is the traffic sign on the opposite side of the passageway B. The control device 16 then assumes that the person is about to step on the second passageway B. After this, at least one light source 40 and/or illumination device 32 of this at least one other traffic sign 10 is activated. In an embodiment, the light sources 40 of the traffic sign in the middle may be adjusted to stay on, if need be, because the person intends to continue to the next pedestrian crossing. In this case, there is no need to separately activate the light source 40 of the traffic sign in the middle, either.

The traffic sign 10 in the middle may have a plurality of illumination devices 32, which may be directed according to the direction the person is going to. The Figures shows the person standing on the traffic island between the first A and second passageway B. The middle traffic sign 10 in connection with the traffic island has recognised a person and noticed that he is intending to continue onto the next passageway B. In such a case, the light sources 40 and illumination devices 32 of the traffic signs on both sides of the passageway B have been switched on. The light sources and illumination devices direct the light directly to the person and/or traffic sign 10 and in addition on the second passageway B. If the person is on the second passageway B on his way towards the last traffic sign, the light sources 40 and/or illumination devices 32 will not be re-activated, because the person is then expected to be exiting the passageway B after he has crossed the pedestrian crossing. The information obtained from at least one detector 34 may comprise at least one of the following: information on a person approaching the traffic sign, information on lighting conditions, and information on the direction of the person approaching the pedestrian crossing. Roads with multiple lanes have multiple pedestrian crossings that a cyclist or pedestrian has to cross. The system for such roads has a plurality of traffic signs 10 in the middle of passageways and they may function according to the principle described in the above.

Figure 4:
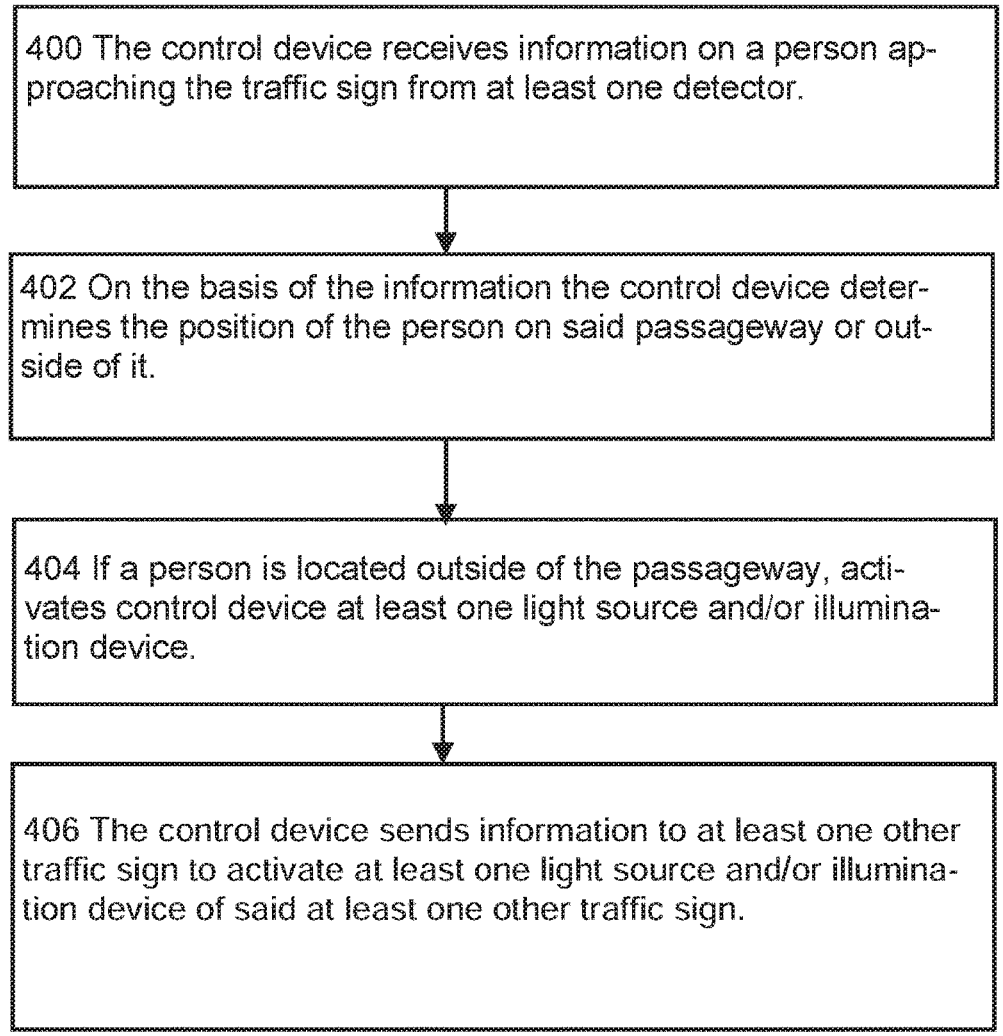
FIG. 4 shows a method according to an embodiment of the invention.

FIG. 4 shows a system for drawing attention to a person crossing a passageway, with the aid of a system, the system comprising at least two traffic signs 10, at least one detector 34, at least one light source 40 within the traffic sign 10, and at least one illumination device to illuminate a person.

In the method the control device 16 receives 400 information on a person approaching the traffic sign 10 from at least one detector 34, and on the basis of the information determines 402 the position of the person on said passageway, or outside of it. If a person is located outside of the passageway, activates 404 at least one light source 40 and/or illumination device 32 of the traffic sign 10, and sends 406 information to at least one other traffic sign 10 to activate at least one light source 40 and/or illumination device of said at least one other traffic sign 10.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A system for drawing attention to a person crossing a passageway, the system comprising:
    at least two traffic signs in connection with each other through the passageway, wherein at least one of the at least two traffic signs comprises a body and two lids, the lids being arranged to be opened upwardly by one or more hinges located at an upper part of the body and supported open by a holder;
    at least one control device operationally connected to each said traffic sign;
    at least one detector;
    at least one light source within each said traffic sign; and
    at least one illumination device associated with each said traffic sign, each said illumination device being arranged to illuminate the person and/or the associated traffic sign;
    wherein the at least one control device is arranged:
        to receive information from the at least one detector and, based on said received information, determine the position of the person in or outside of the passageway; and
        when the person is determined to arrive from somewhere other than the passageway and is positioned outside the passageway, to activate the at least one light source of and/or the at least one illumination device associated with one of the at least two traffic signs, and send further information to at least one other of the at least two traffic signs to activate the at least one light source thereof and/or the at least one illumination device associated therewith.

2. The system as claimed in claim 1, further comprising at least one further traffic sign in connection with the at least two traffic signs through a first and a second passageway, wherein the first passageway is located in relation to a direction of travel of the person,
    wherein the second passageway is located after the first passageway, and
    wherein the at least one control device is further arranged:
        to receive from the at least one detector information on a person approaching the at least one further traffic sign and based on the received information, determine the position of the person in or outside of the first or second passageway, and
        when the person is determined to be located outside the second passageway, to activate at least one light source of and/or at least one illumination device associated with the at least one further traffic sign, and send further information to one or more of the at least two traffic signs to activate the at least one light source thereof and/or the at least one illumination device associated therewith.

3. The system as claimed in claim 2, wherein the information obtained from the at least one detector comprises: information on a person approaching any one of the traffic signs, information on the direction of travel of the person, and/or information on lighting conditions.

4. The system as claimed in claim 3, wherein when the person is determined to be located outside the passageway and the lighting conditions are dusky or dark, the at least one control device is further arranged to activate the at least one light source of and/or the at least one illumination device associated with the one of the at least two traffic signs, and send information to the at least one other of the at least two traffic signs to activate at the least one light source thereof and/or the at least one illumination device associated therewith.

5. The system as claimed in claim 4, wherein said at least one of the at least two traffic signs further comprises a patterned foil arranged to at least partly reflect light from the at least one light source of said at least one of the at least two traffic signs, wherein the at least one light source of said at least one of the at least two traffic signs is arranged, based on the received information, to illuminate the foil from the rear so that the foil is between the at least one light source and a possible detecting party.

6. The system as claimed in claim 5, wherein:
    the at least one illumination device associated with said at least one of the at least two traffic signs is fastened the body and/or the lids thereof and is arranged to illuminate said at least one of the at least two traffic signs from the outside.

7. The system as claimed in claim 6, wherein the at least one illumination device associated with said at least one of the at least two traffic signs is arranged to illuminate a person in the vicinity of said at least one of the at least two traffic signs and/or crossing the passageway.

8. The system as claimed in claim 3, wherein said at least one of the at least two traffic signs further comprises a patterned foil arranged to at least partly reflect light from the at least one light source of said at least one of the at least two traffic signs, wherein the at least one light source of said at least one of the at least two traffic signs is arranged, based on the received information, to illuminate the foil from the rear so that the foil is between the at least one light source and a possible detecting party.

9. The system as claimed in claim 8, wherein:
    the at least one illumination device associated with said at least one of the at least two traffic signs is fastened to the body and/or the lids thereof and is arranged to illuminate said at least one of the at least two traffic signs from the outside.

10. The system as claimed in claim 9, wherein the at least one illumination device associated with said at least one of the at least two traffic signs is arranged to illuminate a person in the vicinity of said at least one of the at least two traffic signs and/or crossing the passageway.

11. The system as claimed in claim 1, wherein the information obtained from the at least one detector comprises: information on a person approaching any one of the traffic signs, information on a direction of travel of the person, and/or information on lighting conditions.

12. The system as claimed in claim 11, wherein when the person is determined to be located outside the passageway and the lighting conditions are dusky or dark, the at least one control device is further arranged to activate the at least one light source of and/or the at least one illumination device associated with the one of the at least two traffic signs, and send the further information to the at least one other of the at least two traffic signs to activate the at least one light source thereof and/or the at least one illumination device associated therewith.

13. The system as claimed in claim 12, wherein said at least one of the at least two traffic signs further comprises a patterned foil arranged to at least partly reflect light from the at least one light source of said at least one of the at least two traffic signs, wherein at least one light source of said at least one of the at least two traffic signs is arranged, based on the received information, to illuminate the foil from the rear so that the foil is between the at least one light source and a possible detecting party.

14. The system as claimed in claim 13, wherein:
the at least one illumination device associated with said at least one of the at least two traffic signs is fastened to the body and/or the lids thereof and is arranged to illuminate said at least one of the at least two traffic signs from the outside.

15. The system as claimed in claim 14, wherein the at least one illumination device associated with said at least one of the at least two traffic signs is arranged to illuminate a person in the vicinity of said at least one of the at least two traffic signs and/or crossing the passageway.

16. The system as claimed in claim 11, wherein said at least one of the at least two traffic signs further comprises a patterned foil arranged to at least partly reflect light from the at least one light source of said at least one of the at least two traffic signs, wherein the at least one light source of said at least one of the at least two traffic signs is arranged, based on the received information, to illuminate the foil from the rear so that the foil is between the at least one light source and a possible detecting party.

17. The system as claimed in claim 16, wherein:
the at least one illumination device associated with said at least one of the at least two traffic signs is fastened to the body and/or the lids thereof and is arranged to illuminate said at least one of the at least two traffic signs from the outside.

18. The system as claimed in claim 17, wherein the at least one illumination device associated with said at least one of the at least two traffic signs is arranged to illuminate a person in the vicinity of said at least one of the at least two traffic signs and/or crossing the passageway.

19. A method for drawing attention to a person crossing a passageway, with the aid of a system, the system comprising at least two traffic signs in connection with each other through the passageway, wherein at least one of the at least two traffic signs comprises a body and two lids, the lids being arranged to be opened upwardly by one or more hinges located at an upper part of the body and supported open by one or more holders;
at least one control device operationally connected to each said traffic sign;
at least one detector;
at least one light source within each said traffic sign; and
at least one illumination device associated with each said traffic sign, each said illumination device being arranged to illuminate the person and/or the associated traffic sign;
wherein the method comprises:
using the at least one control device,
receiving information, from the at least one detector, on a person approaching said at least one of the at least two traffic signs from the at least one detector, and based on said received information, determining the position of the person in or outside of said passageway; and
when the person is determined to arrive from somewhere other than the passageway and is positioned outside the passageway, activating the at least one light source of and/or at least illumination device associated with one of the at least two traffic signs, and sending further information to at least one other of the at least two traffic signs to activate at the least one light source thereof and/or the at least one illumination device associated therewith.

20. The method as claimed in claim 19, wherein the system comprises at least one further traffic sign in connection with the at least two traffic signs through a first and a second passageway, and wherein the first passageway is located in relation to a direction of travel of the person, and the second passageway is located after the first passageway, wherein the method further comprises:
receiving from at least one detector further information on a person approaching said at least one further traffic sign and, based on the received information, determining the position of the person in or outside of the first or second passageway, and
when the person is determined to be located outside the second passageway, activating at least one light source of and/or at least one illumination device associated with the at least one further traffic sign, and sending further information to one or more of the at least two traffic signs to activate the at least one light source thereof and/or the at least one illumination device associated therewith.

21. A system for drawing attention to a person crossing a passageway, the system comprising:
at least two traffic signs in connection with each other through the passageway, each said traffic sign comprising at least one light source, a body, and two lids, wherein the lids are arranged to be opened upwardly by one or more hinges located at an upper part of the body and supported open by a holder;
a control device operationally connected to each said traffic sign;
at least one detector;
at least one illumination device associated with each said traffic sign, each said illumination device being arranged to illuminate the person and/or the associated traffic sign;
wherein the control device is configured to:

receive information from the at least one detector and, based on said received information, determine the position of the person in or outside of the passageway; and when the person is determined to arrive from somewhere other than the passageway and is positioned outside the passageway, activate the at least one light source of and/or the at least one illumination device associated with one of the at least two traffic signs, and send further information to at least one other of the at least two traffic signs to activate the at least one light source thereof and/or the at least one illumination device associated therewith.

22. The system as claimed in claim 21, wherein when the person is determined to be located outside the passageway and lighting conditions are dusky or dark, the control device is further arranged to activate the at least one light source of and/or the at least one illumination device associated with the one of the at least two traffic signs, and send the further information to the at least one other of the at least two traffic signs to activate the at least one light source thereof and/or the at least one illumination device associated therewith.

23. The system as claimed in claim 21, wherein each said traffic sign further comprises a patterned foil arranged to at least partly reflect light from the at least one light source thereof, wherein the at least one light source being arranged, based on the received information, to illuminate the foil from the rear so that the foil is between the at least one light source and a possible detecting party.

24. The system as claimed in claim 21, wherein, for each said traffic sign, the at least one illumination device associated therewith is fastened to the body and/or the lids thereof and is arranged to illuminate the respective traffic sign from the outside.

25. The system as claimed in claim 21, wherein, for each said traffic sign, the at least one illumination device associated therewith is arranged to illuminate a person in the vicinity of the respective traffic sign and/or crossing the passageway.

\* \* \* \* \*